US011273736B2

United States Patent
Salvia, III

(10) Patent No.: US 11,273,736 B2
(45) Date of Patent: Mar. 15, 2022

(54) SEAT ASSEMBLIES HAVING TIP UP AND TILT SEAT CUSHION FRAMES

(71) Applicant: Toyota Motor Engineering & Manufacturing North America, Inc., Plano, TX (US)

(72) Inventor: John J. Salvia, III, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/942,521

(22) Filed: Jul. 29, 2020

(65) Prior Publication Data
US 2022/0032827 A1 Feb. 3, 2022

(51) Int. Cl.
*B60N 2/30* (2006.01)
*B60N 2/02* (2006.01)
*B60N 2/90* (2018.01)

(52) U.S. Cl.
CPC ......... *B60N 2/3045* (2013.01); *B60N 2/0232* (2013.01); *B60N 2/995* (2018.02)

(58) Field of Classification Search
CPC .... B60N 2/3045; B60N 2/304; B60N 2/3038; B60N 2/30; B60N 2/995; B60N 2/0232; B60N 2/02; B60N 2/0224; B60N 2002/0236; B60N 2002/024
USPC ........................................................ 297/330
See application file for complete search history.

(56) References Cited

U.S. PATENT DOCUMENTS

| | | | | |
|---|---|---|---|---|
| 3,588,170 A | * | 6/1971 | Knabusch et al. ... | A47C 1/0355 297/69 |
| 6,129,405 A | * | 10/2000 | Miyahara ............. | B60N 2/3079 296/65.11 |
| 6,439,636 B1 | * | 8/2002 | Kuo ..................... | B60N 2/0232 296/65.01 |
| 9,326,608 B1 | | 5/2016 | Hoy et al. | |
| 9,452,692 B1 | * | 9/2016 | Rawlinson .......... | B60N 2/0232 |
| 2002/0113478 A1 | | 8/2002 | Kasahara | |
| 2009/0096272 A1 | * | 4/2009 | Okano ................. | B60N 2/0232 297/423.3 |

(Continued)

FOREIGN PATENT DOCUMENTS

EP 1820687 A1 8/2007
JP 2008284993 A 11/2008
(Continued)

OTHER PUBLICATIONS

Toyo Seat; Jul. 22, 2019; 5 pages; https://toyoseat.com/engineering-design/.
(Continued)

*Primary Examiner* — Mark R Wendell
(74) *Attorney, Agent, or Firm* — Dinsmore & Shohl LLP

(57) ABSTRACT

A rear seat assembly is provided. The rear seat assembly includes a seat frame, a seat back, a seat cushion frame, and a power tilt assembly. The seat cushion frame is pivotally coupled to the seat frame at a tip up pivot axis to move between a seated position and a tip up position such that in the tip up position, the seat cushion frame is pivoted towards the seat back in a generally vehicle vertical position. The power tilt assembly is coupled to the seat cushion frame and is configured to adjust an angle of a seat cushion with respect to a vehicle floor.

20 Claims, 9 Drawing Sheets

(56) References Cited

U.S. PATENT DOCUMENTS

| | | | |
|---|---|---|---|
| 2010/0244525 A1* | 9/2010 | Ito | B60N 2/0232 |
| | | | 297/353 |
| 2014/0238188 A1* | 8/2014 | Ito | B60N 2/0232 |
| | | | 74/664 |
| 2015/0091338 A1* | 4/2015 | Hayashi | B60N 2/72 |
| | | | 297/180.1 |
| 2016/0318426 A1 | 11/2016 | Aita et al. | |
| 2019/0299818 A1* | 10/2019 | Sasaki | B60N 2/12 |
| 2020/0139851 A1* | 5/2020 | Oshima | B60N 2/18 |
| 2020/0223342 A1* | 7/2020 | Ito | B60N 2/995 |

FOREIGN PATENT DOCUMENTS

| | | |
|---|---|---|
| JP | 2018118531 A | 8/2018 |
| KR | 20150005171 A | 1/2015 |
| WO | 2011030473 A1 | 3/2011 |

OTHER PUBLICATIONS

Knoedler Manufacturs Canada, Ltd.—Air-Chief Seats; Jul. 22, 2019; 3 pages; https://knoedler.com/power-chief/.

\* cited by examiner

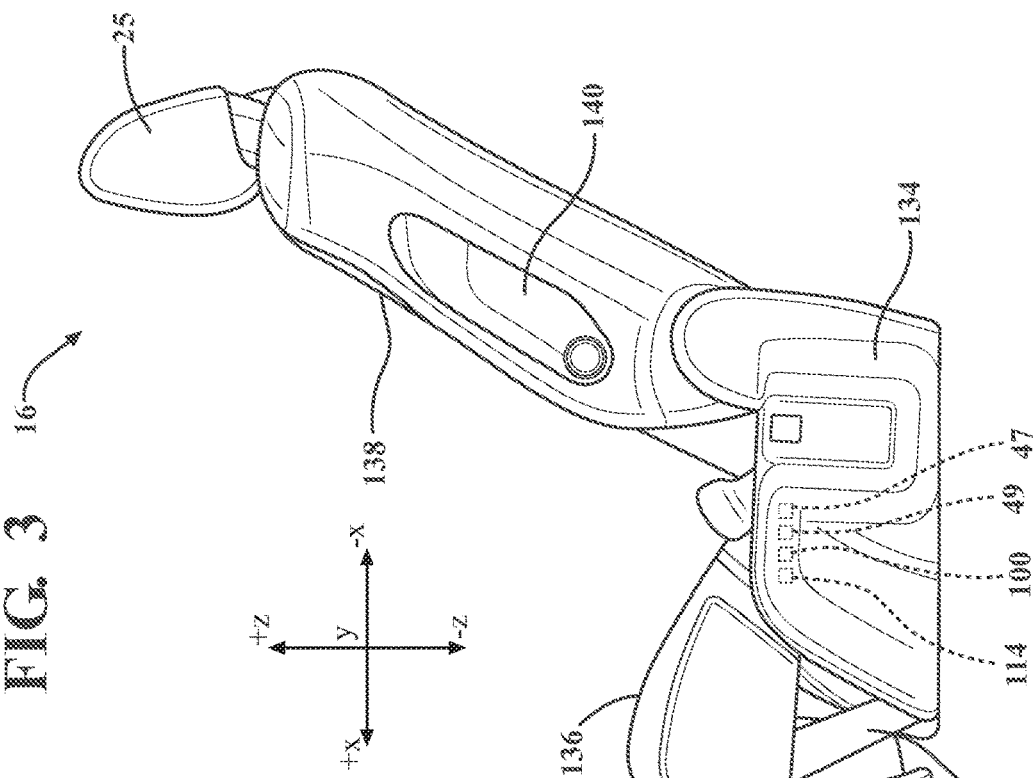
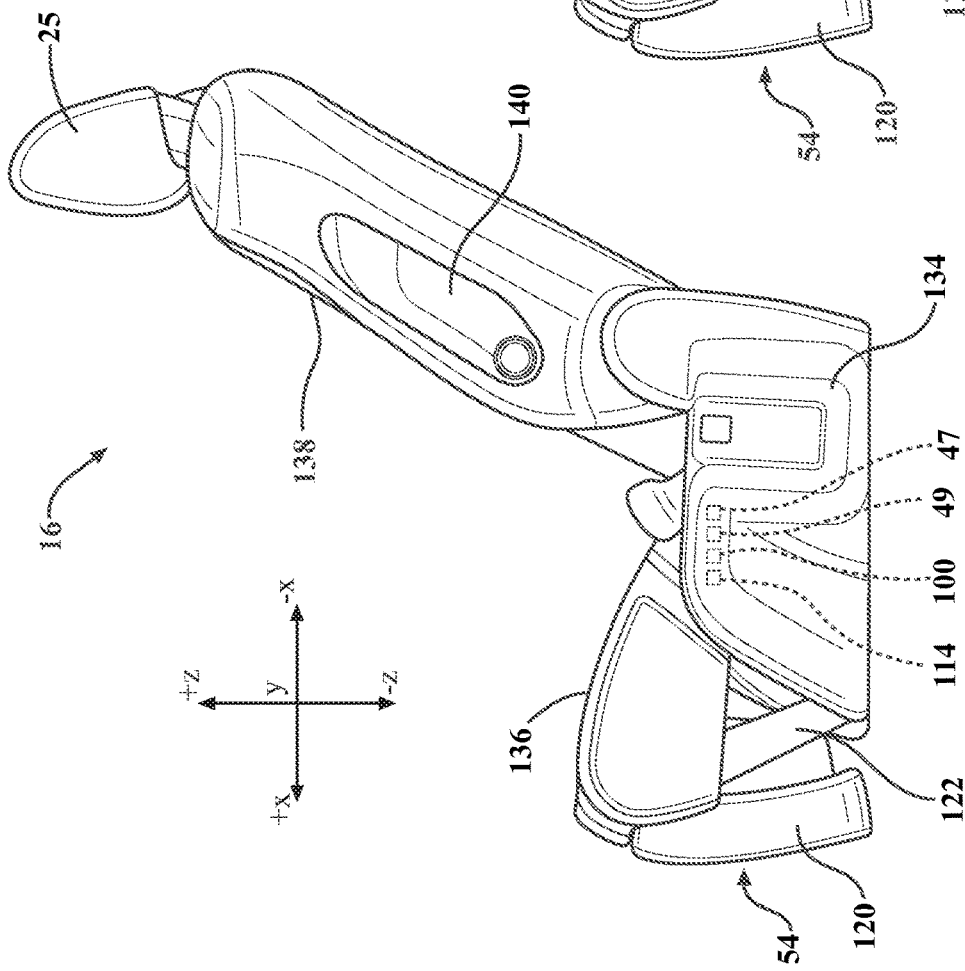

SEAT ASSEMBLIES HAVING TIP UP AND TILT SEAT CUSHION FRAMES

TECHNICAL FIELD

The present specification generally relates to seat assemblies and, more specifically, to rear seat assemblies that include tip up and tilt seat cushion functions.

BACKGROUND

It has been known to provide vehicles with seat assemblies with a stadium style seat cushion moveable between a use position and a tip up position. Further, it has been known to provide seat assemblies with a power tilt adjustment assembly that adjusts an angle of a seat cushion. For example, front seat assemblies of vehicles are known to include a power tilt adjustment assembly that adjusts an angle of the seat cushion by a motor. However, such front seat assemblies are provided with fixed (i.e. non-tip up) seat cushions. It has also been known to provide a seat assembly with an ottoman assembly that includes a powered ottoman that raises and lowers from a front edge of the seat cushion. It has been further known to provide a seat assembly that is attached to a vehicle by a pair of rails that extend in the vehicle lateral direction to allow the seat assembly to slide in a vehicle width direction. However, as ingress, egress and storage space becomes more important, rear seat assemblies need to more versatile in movement.

Accordingly, there is a need for a rear seat assembly that adjusts between a use position and a tip up position, that include a power tilt adjustment assembly that adjusts an angle of the seat cushion by a motor, and that includes a pair of rails that extend in the vehicle lateral direction to allow the seat assembly to slide in a vehicle width direction.

SUMMARY

In one embodiment, a rear seat assembly is provided. The rear seat assembly includes a seat frame, a seat back, a seat cushion frame, and a power tilt assembly. The seat back is coupled to the seat frame. The seat cushion frame is pivotally coupled to the seat frame about a tip up pivot axis to move between a seated position and a tip up position such that in the tip up position, the seat cushion frame is pivoted towards the seat back in a generally vehicle vertical position. The power tilt assembly is coupled to the seat cushion frame. The power tilt assembly includes a tilt motor coupled to the seat cushion frame, a tilt bracket pivotally coupled to the seat cushion frame about a tilt pivot axis, a tilt gear bracket coupled to the tilt motor, and a tilt link pivotally coupled to the tilt gear bracket and the tilt bracket. Upon an operation of the tilt motor, the tilt gear bracket is rotated which moves the tilt link to tilt the tilt bracket about the tilt pivot axis to adjust an angle of the tilt bracket with respect to the seat cushion frame.

In another embodiment, a seat assembly is provided. The seat assembly includes a seat frame, a seat back, a seat cushion frame pivotally coupled to the seat frame, and a power tilt assembly. The power tilt assembly is coupled to the seat cushion frame The power tilt assembly includes a tilt motor coupled to the seat frame, a tilt bracket is pivotally coupled to the seat cushion frame about a tilt pivot axis, a tilt gear bracket coupled to the tilt motor, and a tilt link pivotally coupled to the tilt gear bracket and the tilt bracket. Upon an operation of the tilt motor, the tilt gear bracket is rotated which moves the tilt link to tilt the tilt bracket about the tilt pivot axis to adjust an angle of the tilt bracket with respect to the seat cushion frame. The seat cushion frame is pivotally coupled to the seat frame at a tip up pivot axis to move between a seated position and a tip up position such that in the seated position, the seat cushion frame is configured to support an occupant and in the tip up position, the seat cushion frame is pivoted towards the seat back in a generally vehicle vertical position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2 schematically depicts an isolated side view of the rear seat assembly of FIG. 1 in the seated position, according to one or more embodiments shown or described herein;

FIG. 3 schematically depicts an isolated side view of the rear seat assembly of FIG. 1 with an angle of a seat cushion in a tilted position, according to one or more embodiments shown or described herein;

DETAILED DESCRIPTION

Figure 1:
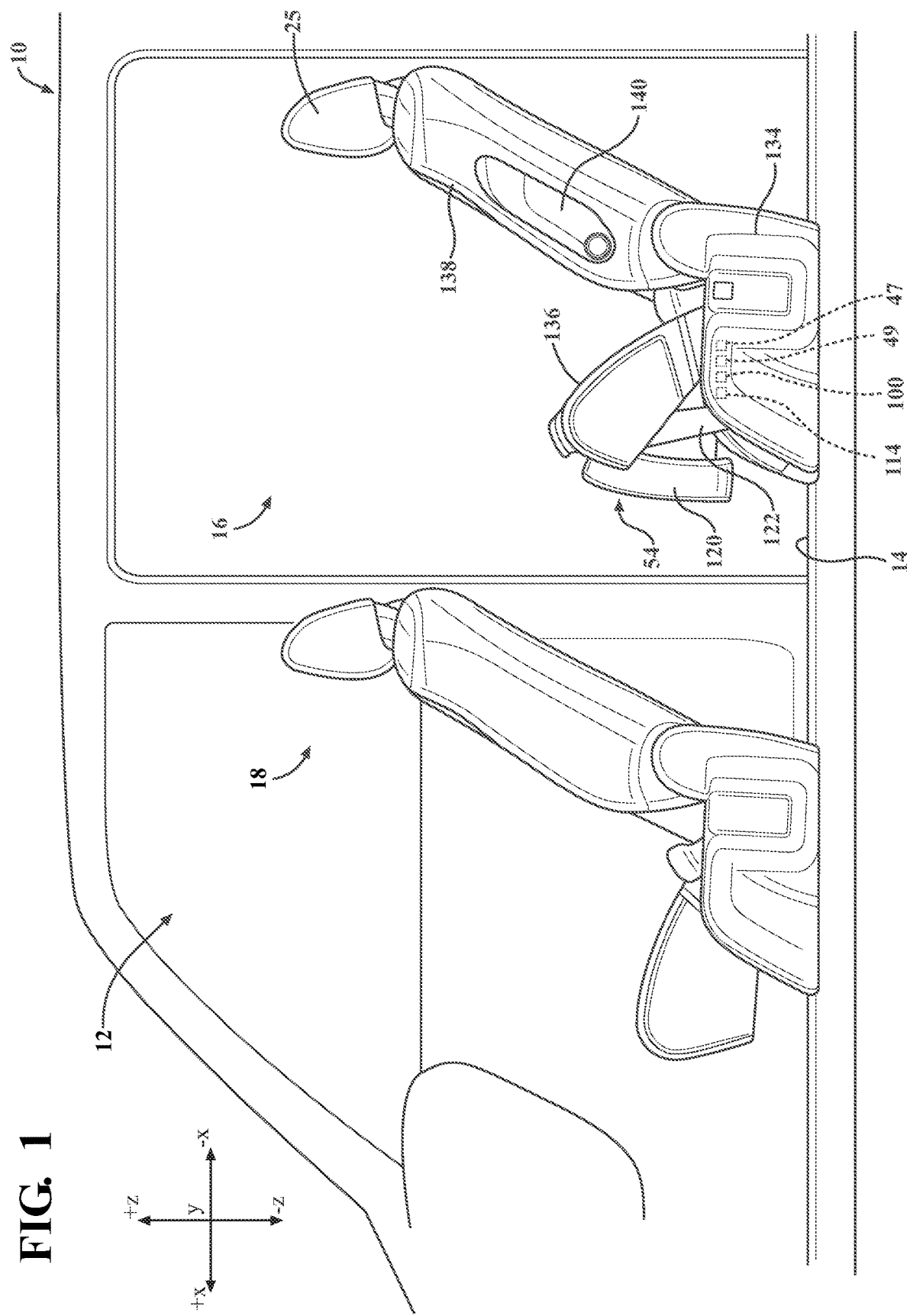
FIG. 1 schematically depicts a partial side view of an environment of a vehicle having a rear seat assembly that is moved from a seated position to a tip up position, according to one or more embodiments shown and described herein.

Embodiments of the present disclosure are directed to a rear seat assembly that includes a seat back, a seat frame and a seat cushion frame. The seat cushion frame is moveable between a seated position and a tip up position. Further, the rear seat assembly includes a power tilt adjustment assembly that adjusts an angle of a seat cushion with respect to the seat cushion frame of the rear seat assembly. In the seated position, the seat cushion frame is configured to support an occupant. In the tip up position, the seat cushion frame is pivoted towards the seat back such that the seat cushion frame is in a generally vertical position.

The power tilt adjustment assembly includes a tilt motor, a tilt bracket, a tilt gear bracket, a tilt link, and a tilt pivot axis. The tilt gear bracket is coupled to the tilt motor. The tilt link is pivotally coupled to the tilt gear bracket and the tilt bracket. The tilt bracket is pivotally coupled to the seat cushion frame at the tilt pivot axis. Upon operation of the tilt motor, the tilt gear bracket is rotated, which moves the tilt link to tilt the tilt bracket about the tilt pivot axis to create a gap portion or an angle between the tilt bracket and the seat cushion frame. The tilt pivot axis and the tip up pivot axis are parallel but spaced apart and are not colinear.

As used herein, the term "vehicle longitudinal direction" refers to the forward-rearward direction of the vehicle (i.e., in the +/− vehicle X-direction as depicted). The term "vehicle lateral direction" refers to the cross-vehicle direction of the vehicle (i.e., in the +/− vehicle Y-direction as depicted), and is transverse to the vehicle longitudinal direction. The term "vehicle vertical direction" refers to the upward-downward direction of the vehicle (i.e., in the +/− vehicle Z-direction as depicted). As used herein, "upper" and "above" are defined as the positive Z direction of the coordinate axis shown in the drawings. "Lower" and "below" are defined as the negative Z direction of the coordinate axis shown in the drawings.

Referring now to the drawings, FIG. 1 schematically depicts a partial side view of a vehicle 10 having a passenger compartment 12. The passenger compartment 12 includes a vehicle floor 14, a rear seat assembly 16 and another seat assembly 18. The rear seat assembly 16 is provided rearward of the another seat assembly 18 in the vehicle longitudinal direction (i.e., in the +/−X direction). As such, the another seat assembly 18 may be a second row seat assembly and/or a first row seat assembly. In some embodiments, the vehicle 10 is a van. In other embodiments, the vehicle 10 may be a car, a sport utility vehicle, a truck, a boat, a plane, or other vehicle types.

Referring to FIGS. 4-9, the rear seat assembly 16 includes a seat cushion frame 20 and a seat frame 19 connected to the vehicle floor 14 of the passenger compartment 12 of the vehicle 10. In some embodiments, the rear seat assembly 16 is a stadium style chair. In other embodiments, the rear seat assembly 16 is a 60/40 bench style seat. The seat cushion frame 20 is pivotally secured to the seat frame 19. The seat frame 19 is fixedly secured to the vehicle floor 14 by a slider mechanism 21.

The slider mechanism 21 includes an upper surface 23a and an opposite lower surface 23b. The lower surface 23b engages with a pair of longitudinal slide rails 22 that extend in the vehicle longitudinal direction (i.e., in the +/−X direction). As such, the slider mechanism 21 moves or slides with respect to the vehicle floor 14 along the pair of longitudinal slide rails 22 in the vehicle longitudinal direction (i.e., in the +/−X direction). That is, in some embodiments, the pair of longitudinal slide rails 22 slidably connect the rear seat assembly 16 to the vehicle floor 14 such that the rear seat assembly 16 is slidably with respect to the vehicle floor 14 via the slider mechanism 21. In some other embodiments, the pair of longitudinal slide rails 22 releasably secure the rear seat assembly 16 to the vehicle floor 14 so as to allow the rear seat assembly 16 to be removed from the passenger compartment 12 of the vehicle 10.

In some embodiments, the rear seat assembly 16 slides in the vehicle longitudinal direction (i.e., in the +/−X direction) via the pair of longitudinal slide rails 22 by a mechanical device, such as a lever and the like. In other embodiments, the rear seat assembly 16 slides in the vehicle longitudinal direction (i.e., in the +/−X direction) via the pair of longitudinal slide rails 22 by a longitudinal slide actuator 29. The longitudinal slide actuator 29 may be any electro and/or mechanically driven actuator that can move or slide the rear seat assembly 16. The longitudinal slide actuator 29 may be activated via a longitudinal slide user interface 49. In some embodiments, the longitudinal slide user interface 49 may be a button or a knob, may be software driven using Wi-Fi or other wireless methods, and the like.

In some embodiments, the rear seat assembly 16 may further includes a pair of cross car slide rails 34 that extend in the vehicle lateral direction (i.e., in the +/−Y direction). The cross car slide rails 34 are coupled to the upper surface 23a of the slider mechanism 21 and slidably connect the rear seat assembly 16 to the vehicle floor 14 such that the rear seat assembly 16 is slidably with respect to the vehicle floor 14 via the slider mechanism 21 in the vehicle lateral direction (i.e., in the +/−Y direction).

Still referring to FIGS. 4-9, in some embodiments, the rear seat assembly 16 slides in the vehicle lateral direction (i.e., in the +/−Y direction) via the cross car slide rails 34 by a mechanical device, such as a lever and the like. In other embodiments, the rear seat assembly 16 slides in the vehicle lateral direction (i.e., in the +/−Y direction) via the cross car slide rails 34 by a cross car actuator 35. The cross car actuator 35 may be any electro and/or mechanically driven actuator that can move or slide the rear seat assembly 16. The cross car actuator 35 may be activated via a cross car slide user interface 47. In some embodiments, the cross car slide user interface 47 may be a button or a knob, may be software driven using Wi-Fi or other wireless methods, and the like. The cross car actuator 35 is separate or different from the longitudinal slide actuator 29.

The rear seat assembly 16 includes a seat back frame 24 that is pivotally connected to the seat frame 19 about a pivot axis P, as discussed in greater detail herein. The seat back frame 24 includes a rear surface 24a and an opposite front surface 24b. The seat back frame 24 includes a headrest 25. The seat back frame 24 includes a pair of spaced apart reinforcement members 27 positioned between the rear surface 24a and the front surface 24b. The pair of spaced apart reinforcement members 27 provide strengthening reinforcement to the seat back frame 24. In some embodiments, the pair of spaced apart reinforcement members 27 are integrally formed as a one piece monolithic structure with the seat back frame 24. In other embodiments, each of the pair of spaced apart reinforcement members 27 are separate pieces bonded or welded to the seat back frame 24.

The seat back frame 24 further includes a recliner mechanism 31 connected to the seat frame 19 and the seat back frame 24. The recliner mechanism 31 is moveable between a locked position and an unlocked position. In the locked position, the recliner mechanism 31 inhibits the seat back frame 24 from pivoting about the pivot axis P. In the unlocked position, the recliner mechanism 31 allows the seat back frame 24 to pivot about the pivot axis P. As such, the seat back frame 24 is pivotal about the pivot axis P forward in the vehicle longitudinal direction (i.e., in the +/−X direction) in the direction of arrow A1 and pivotal about the pivot axis P rearward in the vehicle longitudinal direction (i.e., in the +/−X direction) in the direction of arrow A2.

In some embodiments, the recliner mechanism 31 includes a handle that upon actuation moves the recliner mechanism 31 from the locked position to the unlocked position to allow a user to pivot the seat back frame 24 to a desired position about the pivot axis P.

Still referring to FIGS. 4-9, the seat frame 19 may further include a pair of lower arms 36. Each of the pair of lower arms 36 are spaced apart extending in the vehicle longitudinal direction (i.e., in the +/−X direction). Each of the pair of lower arms 36 include an upper surface 37, an arm interior surface 39a and an opposite arm exterior surface 39b. A cross pipe 38 and a rear cross pipe 40 extend between the pair of lower arms 36 in the vehicle lateral direction (i.e., in the +/−Y direction). That is, the cross pipe 38 and the rear cross pipe 40 each extend perpendicular between the pair of lower arms 36 and couple to each of the pair of lower arms 36.

In some embodiments, a pair of spaced apart retainers 33 extend from the rear cross pipe 40 in the vehicle vertical direction (i.e., in the +/−Z direction). In some embodiments, each of the pair of retainers 33 may generally be a U-shape. In other embodiments, each of the pair of retainers 33 may be other shapes, such as a rectangle, a square, a circle, a hexagon, and/or the like. The pair of retainers 33 may be configured to receive a buckle, hook, or other object to assist in retaining an object onto the seat cushion frame 20.

In some embodiments, the seat frame 19 may be formed from a resin material. In other embodiments, the seat frame 19 may be formed from a metal, such as aluminum, steel and/or the like. Further, in some embodiments, the seat frame 19 may have a square outer perimeter shape. In other embodiments, the outer perimeter shape of the seat frame 19 may be any shape to match the seat cushion frame 20, such as a rectangle, circle, hexagon, octagon, and/or the like.

Still referring to FIGS. 4-9, the seat cushion frame 20 may further include a pair of seat arms 42. Each of the pair of seat arms 42 are spaced apart extending in the vehicle longitudinal direction (i.e., in the +/−X direction). Each of the pair of seat arms 42 include an upper surface 44, an arm interior surface 46a and an opposite arm exterior surface 46b. A seat cross pipe 48 extends between the pair of seat arms 42 in the vehicle lateral direction (i.e., in the +/−Y direction). That is, the seat cross pipe 48 extends perpendicular between the pair of seat arms 42 and couple to each of the pair of seat arms 42. Further, the seat cushion frame 20 includes a front end 50 to which a pair of brackets 52 and an ottoman assembly 54 is coupled thereto, as discussed in greater detail herein.

Figure 4:
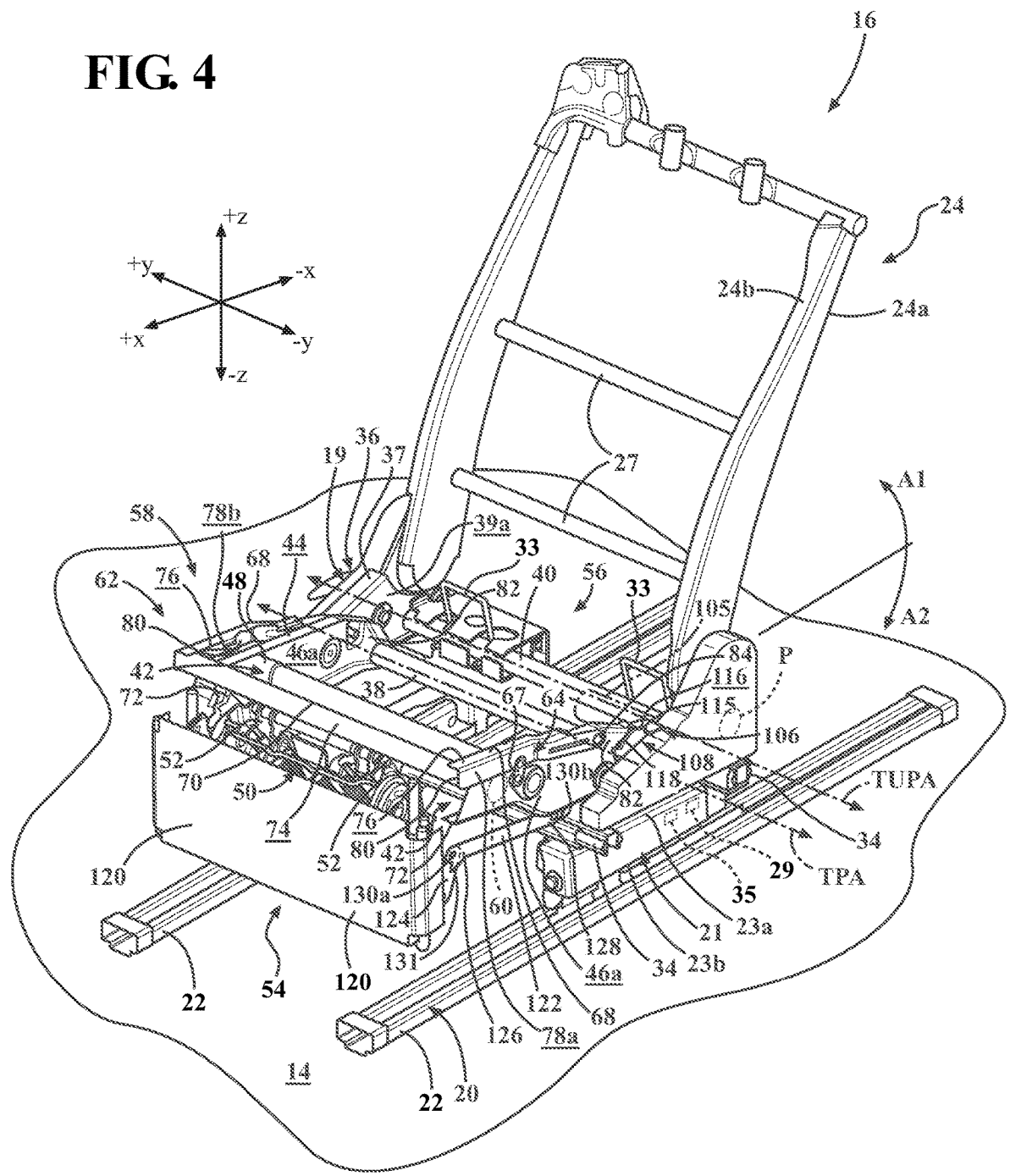
FIG. 4 schematically depicts a partially isolated perspective view of a power tilt assembly and a tip up assembly in the seated position of the rear seat assembly of FIG. 1, according to one or more embodiments shown or described herein.
Figure 6:
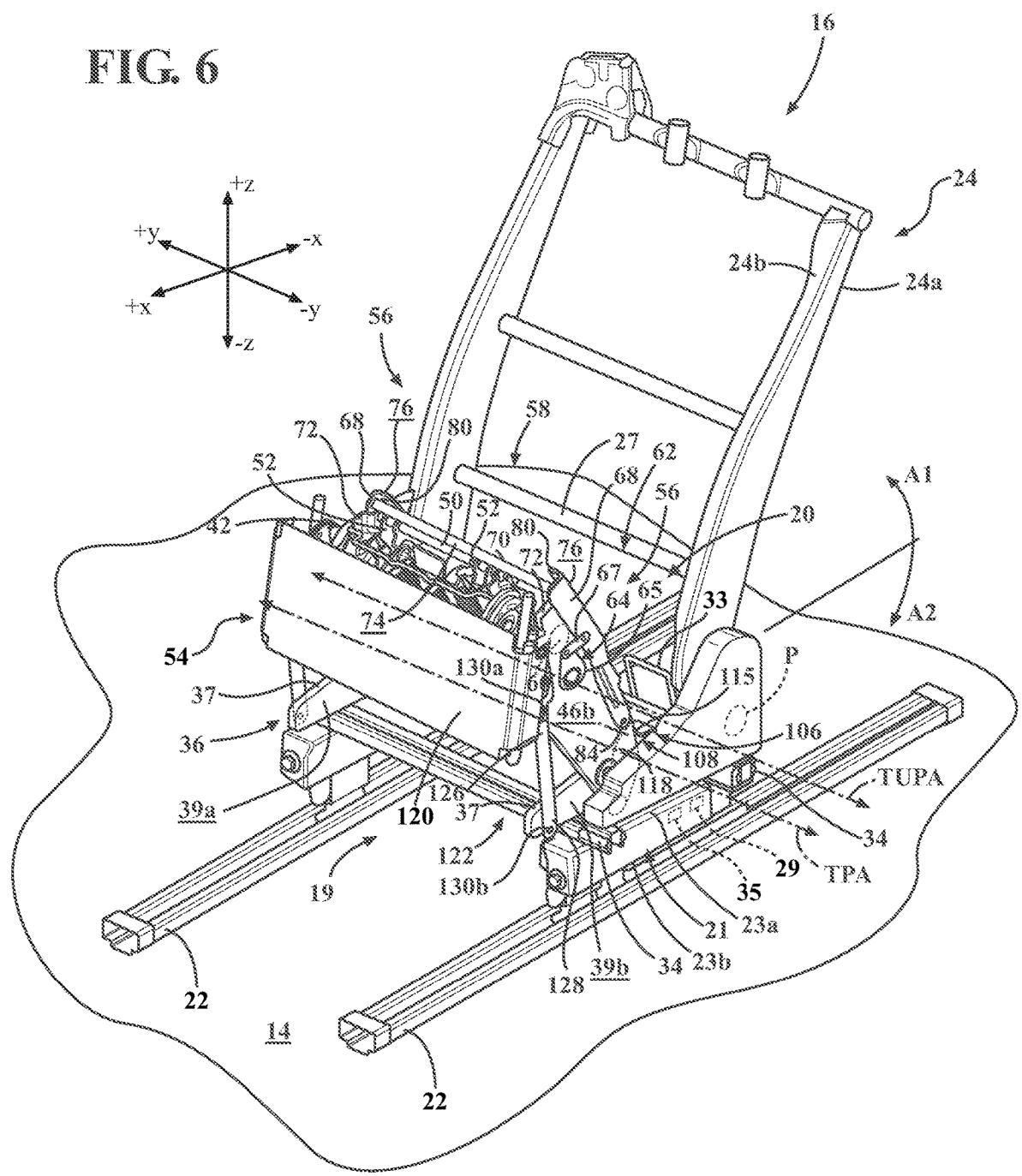
FIG. 6 schematically depicts a partially isolated perspective view of the rear seat assembly of FIG. 4 in the tip up position, according to one or more embodiments shown or described herein.
Figure 7:
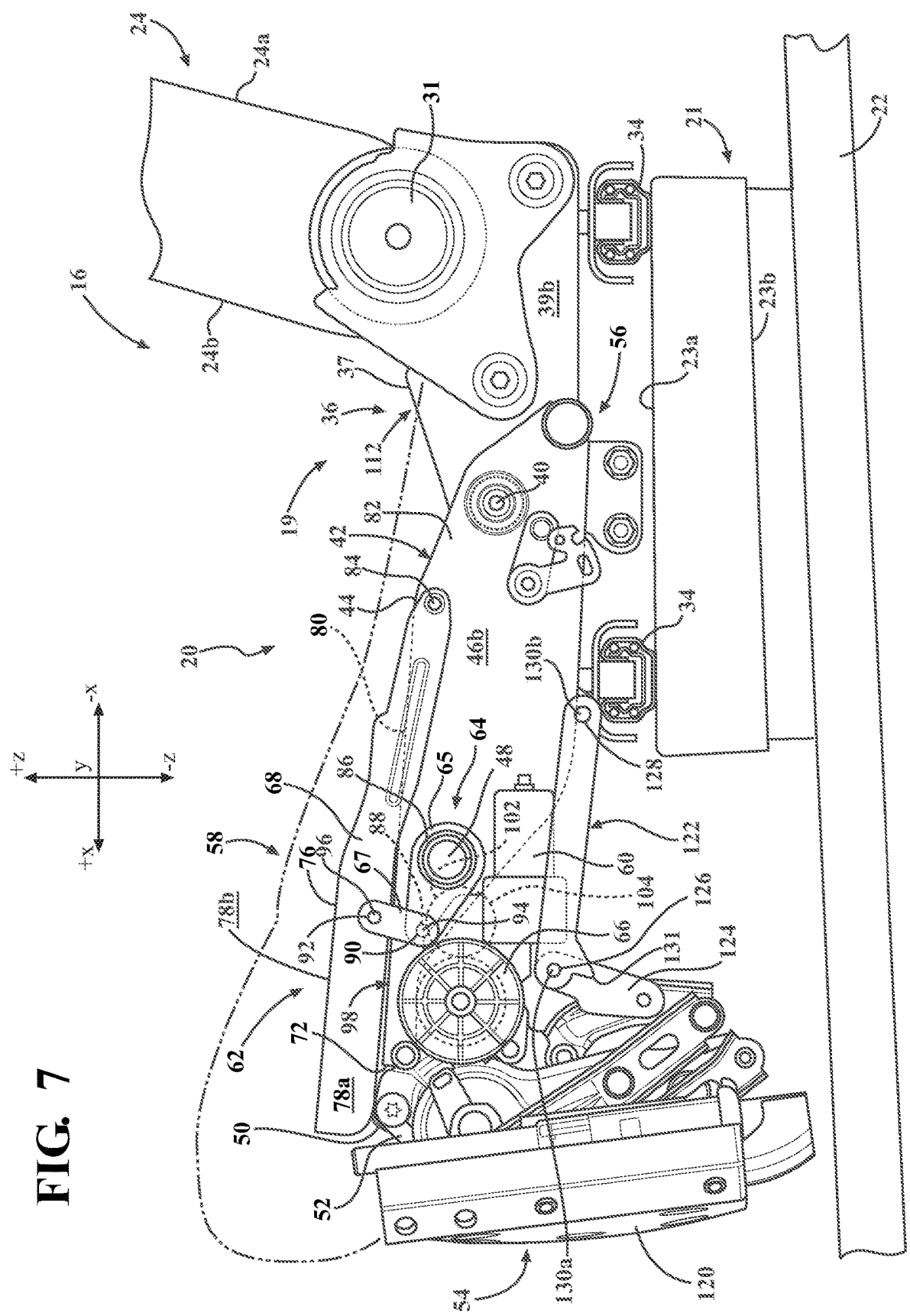
FIG. 7 schematically depicts a side view of the rear seat assembly of FIG. 4 in the seated position, according to one or more embodiments shown or described herein.
Figure 9:
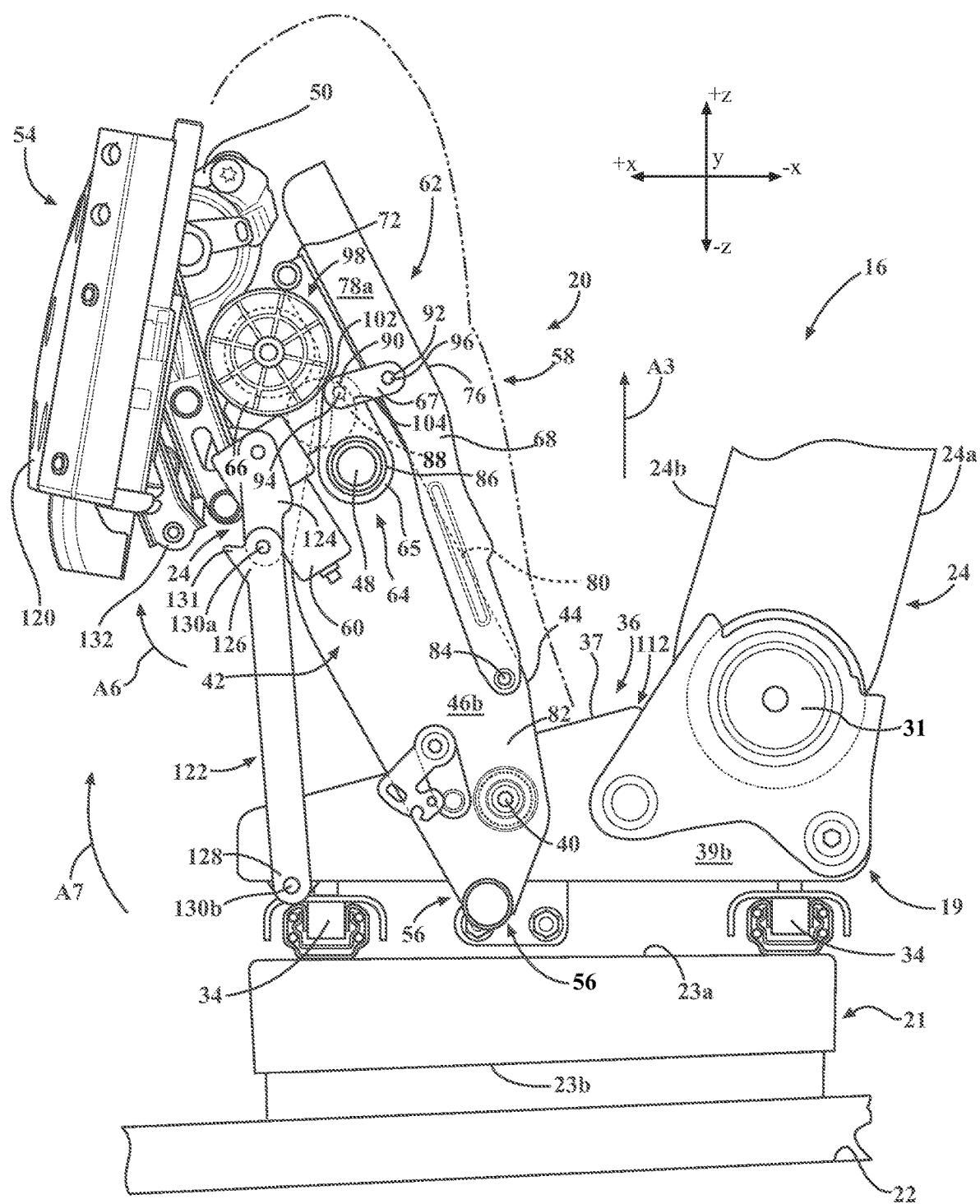
FIG. 9 schematically depicts a side view of the rear seat assembly of FIG. 4 in the tip up position, according to one or more embodiments shown or described herein.
Figure 10:
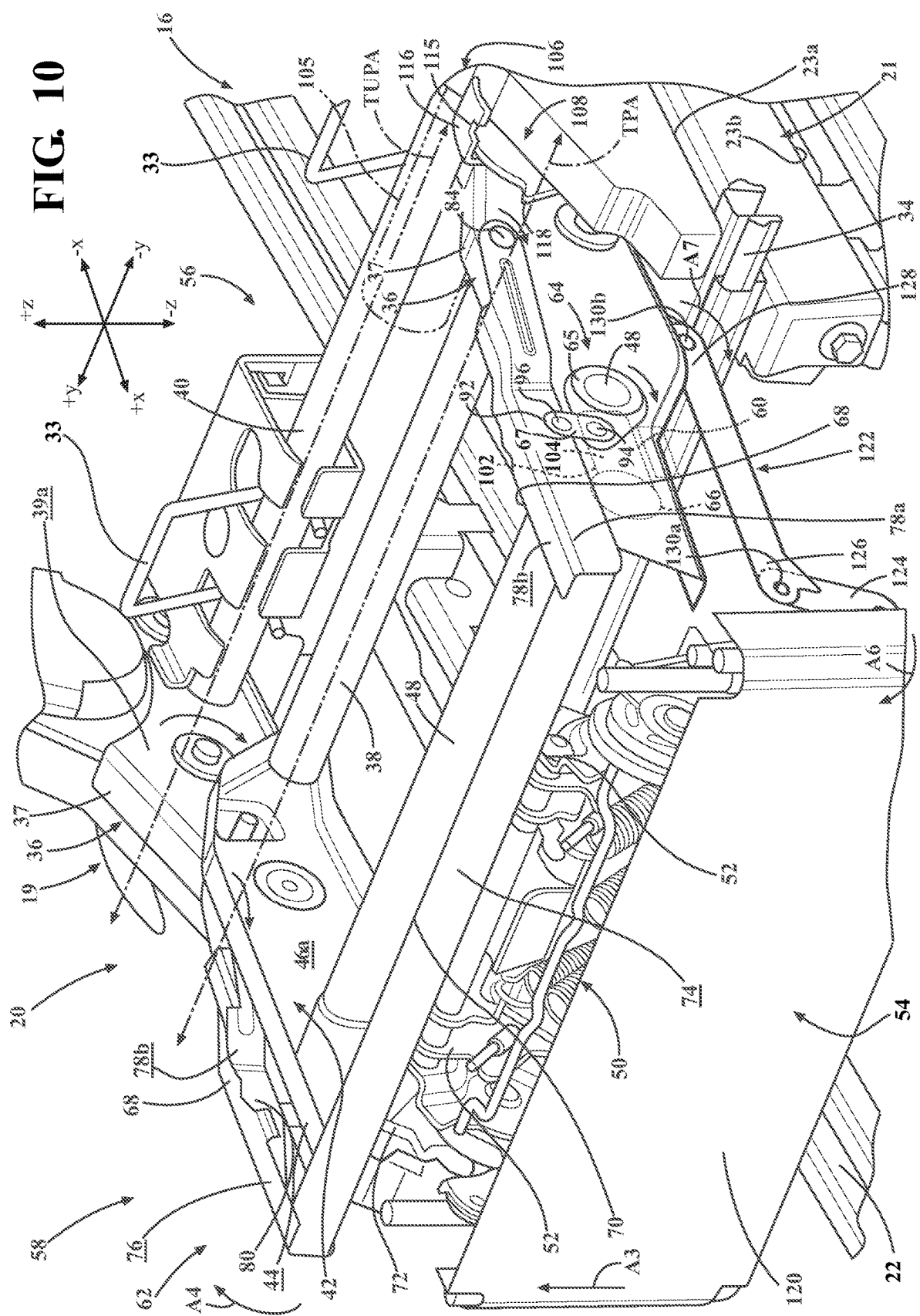
FIG. 10 schematically depicts a partially isolated perspective view of the rear seat assembly of FIG. 4, according to one or more embodiments shown or described herein.

The seat cushion frame 20 may further include a tip up assembly 56 and a power tilt assembly 58. The tip up assembly 56 moves the seat cushion frame 20 between a seated position, as best seen in FIGS. 4 and 7 and a tip up position, as best seen in FIGS. 6 and 9. In the tip up position, the seat cushion frame 20 is pivoted towards the seat back frame 24 in a generally vehicle vertical position (i.e., in the +/−Z direction), in the direction of arrow A3, and as described in greater detail herein. The power tilt assembly 58 is coupled to the seat cushion frame 20 and is configured to adjust an angle of a tilt bracket 62 with respect to the seat cushion frame 20 in a generally vehicle vertical position (i.e., in the +/−Z direction), in the direction of arrow A4, as described in greater detail herein.

In some embodiments, the seat cushion frame 20 may be formed from a resin material. In other embodiments, the seat cushion frame 20 may be formed from a metal, such as aluminum, steel and/or the like. Further, in some embodiments, the seat cushion frame 20 may have a square outer perimeter shape. In other embodiments, the outer perimeter shape of the seat cushion frame 20 may be any shape to match a seat cushion 136 (FIGS. 1-3), such as a rectangle, circle, hexagon, octagon, and/or the like.

Still referring to FIGS. 4-9, the power tilt assembly 58 is coupled to the seat cushion frame 20 and is configured to adjust an angle of the tilt bracket 62 with respect to the seat cushion frame 20 in a generally vehicle vertical position (i.e., in the +/−Z direction), in the direction of arrow A4, as described in greater detail herein. That is, the tilt bracket 62 moves with respect to the seat cushion frame 20 to form an angle or a gap between a portion of the seat cushion frame 20 and the tilt bracket 62. In some embodiments, the angle is an acute angle. In other embodiments, the angle is an obtuse angle.

Figure 5:
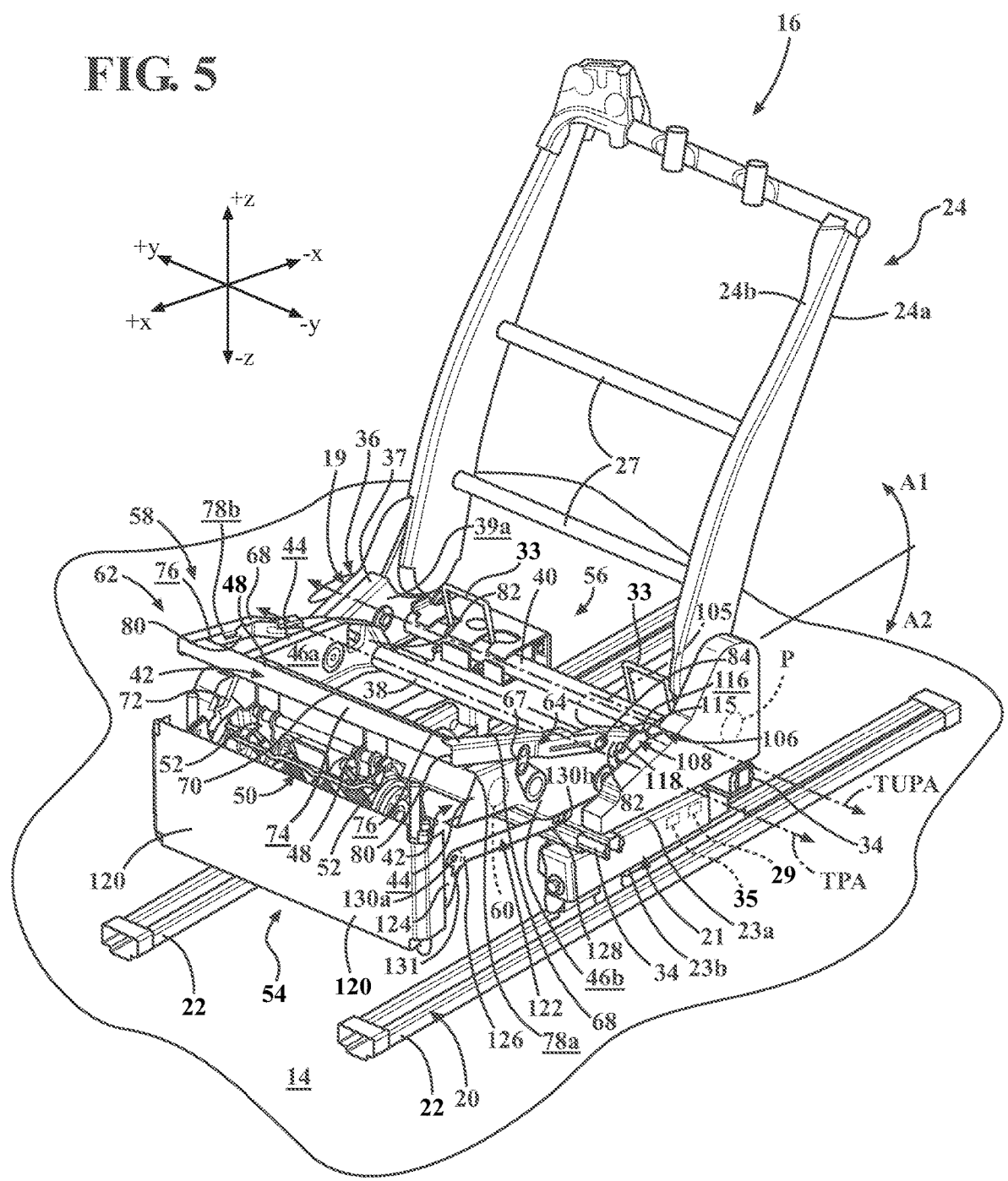
FIG. 5 schematically depicts a partially isolated perspective view of the rear seat assembly of FIG. 4 in the tilted position, according to one or more embodiments shown or described herein.
Figure 8:
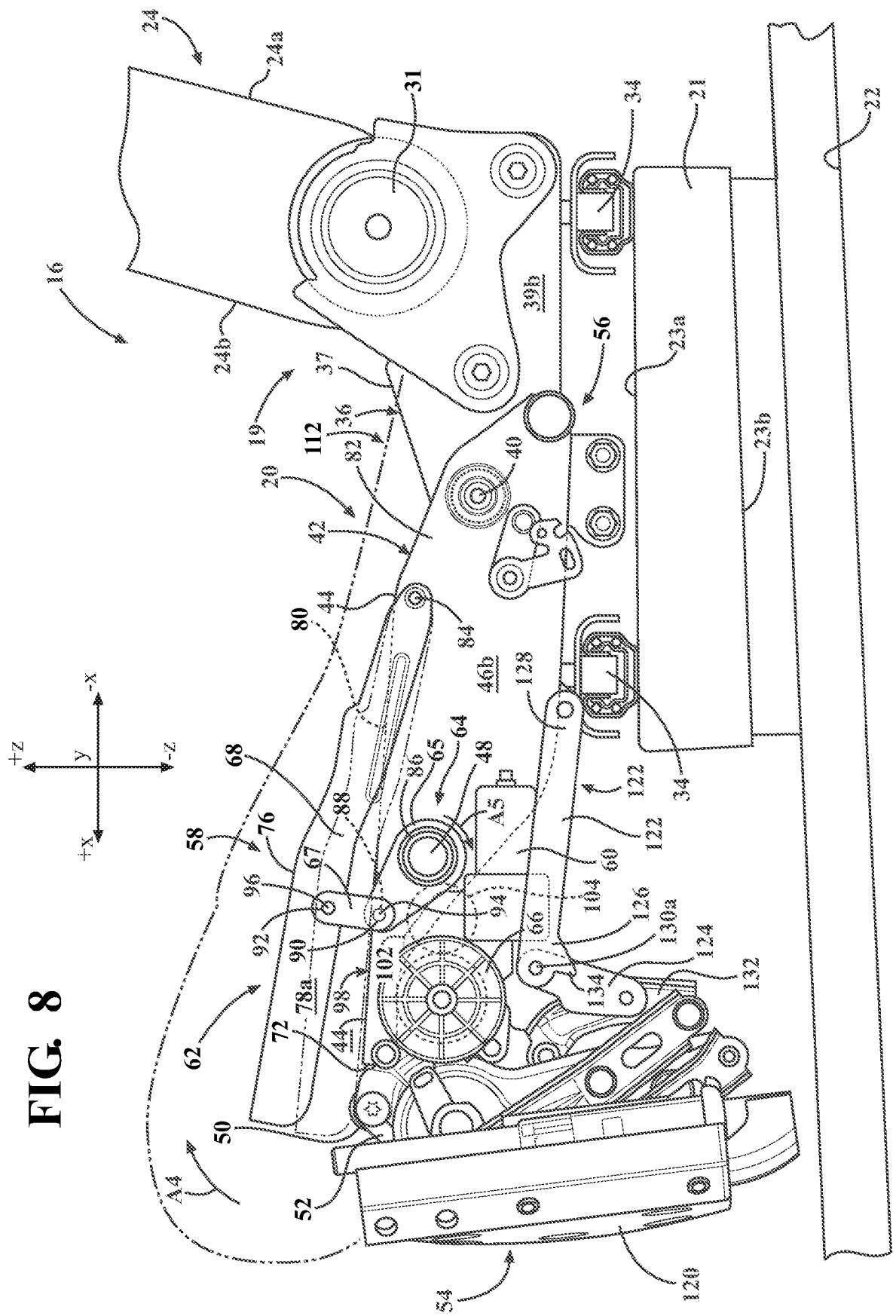
FIG. 8 schematically depicts a side view of the rear seat assembly of FIG. 4 in the tilted position, according to one or more embodiments shown or described herein.

The power tilt assembly may include a tilt motor 60, the tilt bracket 62, a tilt link 64 and a tilt gear bracket 66. The tilt bracket 62 is movable between a lowered position, as best seen in FIGS. 4 and 7, and a tilt positon, as best seen in FIGS. 5 and 8 in the direction of arrow A4. The tilt bracket 62 includes a pair of spaced apart tilt side rails 68 and a tilt cross member 70 positioned between each of the pair of tilt side rails 68. Each of the pair of tilt side rails 68 extend in the vehicle longitudinal direction (i.e., in the +/−X direction) and the tilt cross member 70 extends in the vehicle lateral direction (i.e., in the +/−Y direction). Each of the pair of tilt side rails 68 extend in the vehicle longitudinal direction (i.e., in the +/−X direction) beyond a front or terminating end 72 of the seat cushion frame 20 and/or the pair of brackets 52 that couple the ottoman assembly 54 to the seat cushion frame 20, as discussed in greater detail herein.

In some embodiments, the tilt cross member 70 includes an exterior surface 74 that extends a length of the tilt cross member 70 in the vehicle lateral direction the vehicle vertical direction (i.e., in the +/−Y direction). Further, each of the pair of tilt side rails 68 include a bracket upper surface 76, a bracket exterior surface 78a and an opposite bracket interior surface 78b that each extend downwardly from the bracket upper surface 76 of the pair of tilt side rails 68 in the vehicle vertical direction (i.e., in the +/−Z direction).

The bracket upper surface 76, the bracket exterior surface 78a and the bracket interior surface 78b of the pair of tilt side rails 68 form a receiving channel 80 that receives at least a portion the upper surface 44 of the pair of seat arms 42. That is, when the power tilt assembly 58 is in the lowered position (e.g., not in an adjusted position), at least a portion the upper surface 44 of the pair of seat arms 42 is positioned within the receiving channel 80 such that the each of the pair of tilt side rails 68 rest on the upper surface 44 of the pair of seat arms 42.

Still referring to FIGS. 4-9, the tilt bracket 62 is pivotally coupled to each of the pair of seat arms 42 at rear portion 82 of the pair of seat arms 42 via a fastener 84, such as a bolt, bolt, rivet, and the like. As such, the rear portion 82 of the pair of seat arms 42 and the fastener 84 form a tilt pivot axis TPA to pivotally move the tilt bracket 62 in the direction of arrow A4 about the tilt pivot axis TPA with respect to the pair of seat arms 42 between the lowered position and the tilt position. The tilt pivot axis TPA is positioned through an upper portion of the pair of seat arms 42 below the upper surface 44 in the vehicle vertical direction (i.e., in the +/−Z direction). The tilt pivot axis TPA is also positioned forward of the rear cross pipe 40 of the seat frame 19 in the vehicle longitudinal direction (i.e., in the +/−X direction). Further, the tilt pivot axis TPA passes through or extends in the vehicle lateral direction (i.e., in the +/−Y direction) through the pair of seat arms 42.

The tilt link 64, in some embodiments, may generally include a body portion 65 and a tilt connector portion 67. In some embodiments, the body portion 65 may be a teardrop shape. In other embodiments, the body portion 65 may be any shape, such as square, triangle, rectangle, octagon, circular, any irregular shape, and/or the like. The tilt connector portion 67 is coupled to the body portion 65 and the tilt bracket 62. The body portion 65 includes a first body bore 86 and a second body bore 88. The first body bore 86 is configured to receive a portion of the cross pipe 38 such that the body portion 65 of the tilt link 64 pivots, or rotates about the cross pipe 38, in the direction of arrow A5, between a retracted position, as best seen in FIG. 7, and a rotated position, as best seen in FIG. 8.

The tilt connector portion 67 includes a first connector bore 90 and a spaced apart second connector bore 92. The first connector bore 90 corresponds to the second body bore 88 of the body portion 65. The first connector bore 90 of the tilt connector portion 67 and the second body bore 88 of the body portion 65 are configured to receive a body fastener 94, such as a bolt, screw, rivet, and the like, to pivotally couple the tilt connector portion 67 to the body portion 65. The second connector bore 92 is configured to receive a connector fastener 96, such as a bolt, screw, rivet, and the like, to pivotally couple the tilt connector portion 67 to at least one of the pair of tilt side rails 68. As such, as the body portion 65 rotates, the tilt connector portion 67 pivots or moves so to move the pair of tilt side rails 68 from the lowered position into the tilt position. That is, in the rotated position, the tilt link 64 displaces or pivotally moves the tilt bracket 62 in the direction of arrow A4 about the tilt pivot axis TPA from the lowered position to the tilted position.

Still referring to FIGS. 4-9, the body portion 65 is coupled to the tilt gear bracket 66 such that the tilt gear bracket 66 rotates or moves the body portion 65 of the tilt link 64, as discussed in greater detail herein. The tilt gear bracket 66 includes a plurality of gears 98 that couple the tilt gear bracket 66 to the tilt motor 60 and the tilt link 64. In some embodiments, the tilt gear bracket 66 includes a bracket portion 102 and a spur gear portion 104. The bracket portion 102 couples the tilt gear bracket 66 to one of the pair of seat arms 42. The spur gear portion 104 is rotatably coupled to the tilt motor 60 and is in mechanical communication with the body portion 65 of the tilt link 64. The tilt gear bracket 66 may be mechanically or electrically actuated by an actuator, such as the tilt motor 60.

The tilt motor 60 and the tilt gear bracket 66 are coupled to at least one of the pair of seat arms 42 of the seat cushion frame 20 and between each of the pair of seat arms 42 and forward of the rear cross pipe 40 of the seat frame 19 in the vehicle longitudinal direction (i.e., in the +X direction). The tilt motor 60 may include an elongated member, such as a shaft, and is configured to rotate the elongated member to move or rotate the spur gear portion 104 of the tilt gear bracket 66, which in turn moves or rotates the body portion 65 of the tilt bracket 62.

Still referring to FIGS. 4-9, in the unactuated position, the tilt gear bracket 66 does not apply a force onto the body portion 65 of the tilt link 64. As such, in the unactuated position, the tilt link 64 is in the retracted position. In the actuated position, the spur gear portion 104 of the tilt gear bracket 66 applies a force on the body portion 65 such that the tilt link 64 is pivotally moved into the rotated position. That is, upon an actuation by the tilt motor 60, the spur gear portion 104 of the tilt gear bracket 66 is rotated, which moves the tilt link 64 to move, or tilt the tilt bracket 62 about the tilt pivot axis TPA.

It should be appreciated that the power tilt assembly 58 may be controlled by the user via a tilt user interface 100. In some embodiments, the tilt user interface 100 may be a lever that is mechanically and/or electrically in communication with the tilt motor 60 to actuate the tilt motor 60 upon an activation of the tilt user interface 100, such as by a movement of the lever. In other embodiments, the tilt user interface 100 may be a button or a knob, may be software driven using Wi-Fi or other wireless methods, and the like.

The tip up assembly 56 is coupled to the seat cushion frame 20 and the seat frame 19 and is configured to move the seat cushion frame 20 between the seated position, as best seen in FIGS. 4 and 7 and the tip up position, as best seen in FIGS. 6 and 9. The tip up assembly 56 may include a tip up motor 105, a tip up bracket 106, and a tip up gear 108.

The tip up bracket 106 is coupled to the arm interior surface 39a of the pair of lower arms 36 and to the arm interior surface 46a of the pair of seat arms 42. The tip up bracket 106 is coupled at a rear portion 112 of the pair of lower arms 36 and at the rear portion 82 of the pair of seat arms 42. The tip up bracket 106 is fixedly coupled to the pair of lower arms 36 such that the tip up bracket 106 remains stationary between the use position and the tip up position of the seat cushion frame 20, as discussed in greater detail herein. The tip up bracket 106 further includes a notch 115 in an upper bracket surface 116. The tip up gear 108 is rotatably coupled to the tip up bracket 106 beneath the upper bracket surface 116 such that the a protrusion 118 of tip up gear 108 is received in the notch 115 when the seat cushion frame 20 is in the tip up position, as discussed in greater detail herein.

Still referring to FIGS. 4-9, in some embodiments, the tip up bracket 106, the tip up gear 108 and the rear cross pipe 40 form a tip up pivot axis TUPA to pivot or move the seat cushion frame 20 between the seated position and the tip up position about the rear cross pipe 40 in the vehicle vertical direction (i.e., in the +/−Z direction) in the direction indicted by the arrow A3. It should be understood that the tilt pivot axis TPA and the tip up pivot axis TUPA are parallel, but spaced apart and are not colinear. Further, the tip up pivot axis TUPA passes through or extends in the vehicle lateral direction (i.e., in the +/−Y direction) through the pair of lower arms 36. It should be appreciated that in the tip up position, the power tilt assembly 58 is moved or pivoted with the seat cushion frame 20. That is, in the tip up position, the tilt motor 60, the tilt bracket 62, the tilt link 64, and the tilt gear bracket 66 are pivoted towards the seat back frame 24 in the generally vehicle vertical position (i.e., in the +/−Z direction).

In some embodiments, when the tip up motor 105 is included, the tip up motor 105 may be used to actuate or rotate the tip up gear 108 within the tip up bracket 106. The tip up motor 105 may be positioned above the rear cross pipe 40 and/or rearward of the rear cross pipe 40 in the vehicle longitudinal direction (i.e., in the +/−X direction). Further, the tip up motor 105 may be positioned between each of the pair of lower arms 36 and below the upper surface 37 of the lower arms 36 in the vehicle vertical direction (i.e., in the +Z direction). The tip up motor 105 may include an elongated member, such as a shaft, that is in communication with the tip up gear 108 and is configured to rotate the tip up gear 108, which in turn moves or rotates the pair of seat arms 42.

In the unactuated position, the tip up gear 108 does not apply a force onto the pair of seat arms 42. As such, in the unactuated position, the tip up gear 108 is in an non-rotated position. In some embodiments the tip up gear 108 may be biased towards the non-rotated position. In the actuated position, the tip up gear 108 is rotated with a force greater than the biasing force to apply a force on the pair of seat arms 42 such that the pair of seat arms 42 are pivotally moved into the tip up position. That is, upon an actuation by the tip up motor 105, the tip up gear 108 is rotated, which causes the pair of seat arms 42 to move, or pivot about the tip up pivot axis TUPA.

Still referring to FIGS. 4-9, it should be appreciated that the tip up assembly 56 may be controlled by the user via a tip up user interface 114. In some embodiments, the tip up user interface 114 may be a lever that is mechanically and/or electrically in communication with the tip up motor 105 to actuate the tip up motor 105 upon an activation of the tip up user interface 114, such as by a movement of the lever. In other embodiments, the tip up user interface 114 may be a button or a knob, may be software driven using Wi-Fi or other wireless methods, and the like.

The rear seat assembly 16 includes an ottoman assembly 54 that is rotatably or pivotally coupled to the front end 50 of the seat cushion frame 20 via the pair of brackets 52. The ottoman assembly 54 includes an ottoman 120 and an ottoman tip up link 122 that is rotatably coupled to an ottoman bracket 124 and the lower arm 36. In some embodiments, the ottoman tip up link 122 may be a rigid member that has a generally dog bone shape. In other embodiments, the ottoman tip up link 122 may be a four bar linkage. In other embodiments, the ottoman tip up link 122 may be other shapes such as a square, rectangle, circle, hexagon, and the like. Further, in other embodiments, the ottoman tip up link 122 may be a flexible material, a resilient material, and/or the like. The ottoman tip up link 122 includes a first end 126 and an opposite second end 128.

Each of the first and second ends 126, 128 include a pair of tip up bores 130a, 130b. Each of the tip up bores 130a, 130b are configured to receive a fastener such as a bolt, screw, rivet, and the like, to couple the ottoman tip up link 122 to the ottoman bracket 124 and to the lower arm 36. That is, the first end 126 is rotatably coupled to the ottoman bracket 124, via the fastener, to rotate in the general vehicle vertical direction (i.e., in the +/−Z direction) as illustrated by the arrow A6, when the seat cushion frame 20 moves or rotates between the seated position and the tip up position, and vice versa. The second end 128 is rotatably coupled to the lower arm 36, via the fastener, to rotate in the general vehicle vertical direction (i.e., in the +/−Z direction) as illustrated by the arrow A7, when the seat cushion frame 20 moves or rotates between the seated position and the tip up position, and vice versa. Further, in some embodiments, the first end 126 further includes an ottoman protrusion 131 that may engage with other components of the ottoman assembly 54 when the seat cushion frame 20 is in the seated position, as discussed in greater detail herein.

Still referring to FIGS. 4-9, the ottoman bracket 124 is pivotally attached to an ottoman support 132 to couple the ottoman tip up link 122 to the ottoman support 132. That is, the ottoman bracket 124 and the first end 126 of the ottoman tip up link 122 are both rotatably coupled so to move relative to the ottoman support 132. In some embodiments, the ottoman protrusion 131 of the ottoman tip up link 122 may engage with the ottoman bracket 124 of the ottoman assembly 54 when the seat cushion frame 20 is in the seated position, as discussed in greater detail herein.

When the seat cushion frame 20 is in the tip up position, the ottoman assembly 54 is pivoted towards the seat back frame 24 in the vehicle vertical position (i.e., in the +/−Z direction) and maintains a generally perpendicular orientation with respect to the vehicle floor 14. That is, the ottoman assembly 54 generally only moves in the vehicle vertical direction (i.e., in the +/−Z direction) while maintaining the vehicle longitudinal direction (i.e., in the +/−X direction) and the vehicle lateral direction (i.e., in the +/−Y direction). It should be appreciated that the rotation and/or pivoting of the ottoman tip up link 122 assists or permits the ottoman assembly 54 to move in the vehicle vertical direction without influencing the other directions (e.g., the lateral and/or longitudinal directions).

Now referring back to FIGS. 1-3, the rear seat assembly 16 may include a side shield 134 that may be a plastic material that is configured to house at least a portion of the seat back frame 24 (FIG. 4), the seat frame 19 (FIG. 4) and the seat cushion frame 20 (FIG. 4). IT should be appreciated that a plurality of user interfaces (e.g., the cross car slide user interface 47, the longitudinal slide user interface 49, the tilt user interface 100 and the tip up user interface 114) may extend beyond the side shield 134. Further, a seat cushion 136 may be positioned on the seat cushion frame 20 (FIG. 4). It should be appreciated that the seat cushion 136 is coupled to the seat cushion frame 20 (FIG. 4) such that the seat cushion frame 20 may be tilted and/or tipped up, as discussed in greater detail herein. A seat back cushion 138 may be coupled to the seat back frame 24 (FIG. 4). In some embodiments, an arm rest 140 may be rotatable coupled to the seat back frame 24 (FIG. 4) and configured to rotate from a use position and a storage position, as best seen in FIGS. 1-3.

Embodiments of the present disclosure are directed to a rear seat assembly that includes a seat cushion frame that is moveable between a seated position and a tip up position. Further, the rear seat assembly includes a power tilt adjustment assembly that adjusts an angle of the seat cushion frame with respect to a floor of a vehicle. In the seated position, the seat cushion frame is configured to support an occupant. In the tip up position, the seat cushion frame is pivoted towards a seat back such that the seat cushion frame is in a generally vertical position. The power tilt adjustment assembly moves the seat cushion frame about a tilt pivot axis. The tilt pivot axis and the tip up pivot axis are parallel but spaced apart and are not collinear.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:
1. A rear seat assembly comprising:
   a seat frame;
   a seat back coupled to the seat frame;
   a seat cushion frame pivotally coupled to the seat frame about a tip up pivot axis to move between a seated position and a tip up position, in the tip up position the seat cushion frame is pivoted towards the seat back in a generally vehicle vertical position;
   a power tilt assembly coupled to the seat cushion frame, the power tilt assembly comprising:
      a tilt motor coupled to the seat cushion frame,
      a tilt bracket is pivotally coupled to the seat cushion frame about a tilt pivot axis,
      a tilt gear bracket coupled to the tilt motor, and
      a tilt link pivotally coupled to the tilt gear bracket and the tilt bracket, wherein upon an operation of the tilt motor, the tilt gear bracket is rotated which moves the tilt link to tilt the tilt bracket about the tilt pivot axis to adjust an angle of the tilt bracket with respect to the seat cushion frame.

2. The rear seat assembly of claim 1, wherein the tilt pivot axis is spaced apart from the tip up pivot axis.

3. The rear seat assembly of claim 1, further comprising:
a tip up bracket coupled to the seat cushion frame at the tip up pivot axis, and
a tip up gear rotatably coupled to the tip up bracket,
wherein the tip up gear is rotated within the tip up bracket which moves the seat cushion frame about the tip up pivot axis.

4. The rear seat assembly of claim 1, wherein in the seated position, the seat cushion frame is configured to support an occupant.

5. The rear seat assembly of claim 1, further comprising:
an ottoman assembly that is pivotally connected to the seat cushion frame,
wherein when the seat cushion frame is in the tip up position, the ottoman assembly is pivoted towards the seat back in the generally vehicle vertical position.

6. The rear seat assembly of claim 5, wherein when the ottoman assembly is pivoted towards the seat back in the generally vehicle vertical position, the ottoman assembly maintains a perpendicular orientation with respect to a vehicle floor.

7. The rear seat assembly of claim 1, further comprising:
a pair of cross car slide rails that attach to the seat frame such that the seat frame is slidable in a vehicle lateral direction via the pair of cross car slide rails.

8. The rear seat assembly of claim 7, wherein the tilt pivot axis and the tip up pivot axis are each positioned in between the pair of cross car slide rails.

9. The rear seat assembly of claim 1, further comprising:
a pair of longitudinal slide rails that attach the seat frame to a vehicle floor such that the rear seat assembly is slidable in a vehicle longitudinal direction.

10. The rear seat assembly of claim 1, wherein in the tip up position, the tilt motor and the tilt bracket are pivoted towards the seat back in the generally vehicle vertical position.

11. A seat assembly having a seat frame, a seat back and a seat cushion frame pivotally coupled to the seat frame, the seat assembly comprising:
a power tilt assembly coupled to the seat cushion frame, the power tilt assembly comprising:
a tilt motor coupled to the seat frame,
a tilt bracket is pivotally coupled to the seat cushion frame about a tilt pivot axis,
a tilt gear bracket coupled to the tilt motor, and
a tilt link pivotally coupled to the tilt gear bracket and the tilt bracket,
wherein upon an operation of the tilt motor, the tilt gear bracket is rotated which moves the tilt link to tilt the tilt bracket about the tilt pivot axis to adjust an angle of the tilt bracket with respect to the seat cushion frame, and
wherein the seat cushion frame is pivotally coupled to the seat frame about a tip up pivot axis to move between a seated position and a tip up position, in the seated position, the seat cushion frame is configured to support an occupant and in the tip up position, the seat cushion frame is pivoted towards the seat back in a generally vehicle vertical position.

12. The seat assembly of claim 11, wherein the tilt pivot axis is spaced apart from the tip up pivot axis.

13. The seat assembly of claim 11, further comprising:
a tip up bracket pivotally coupled to the seat cushion frame at the tip up pivot axis, and
a tip up gear rotatably coupled to the tip up bracket,
wherein upon an actuation, the tip up gear is rotated which moves the seat cushion frame about the tip up pivot axis.

14. The seat assembly of claim 11, further comprising:
an ottoman assembly that is pivotally connected to the seat cushion frame,
wherein when the seat cushion frame is in the tip up position, the ottoman assembly is pivoted towards the seat back in the generally vehicle vertical position.

15. The seat assembly of claim 14, wherein when the ottoman assembly is pivoted towards the seat back in the generally vehicle vertical position, the ottoman assembly maintains a perpendicular orientation with respect to a vehicle floor.

16. The seat assembly of claim 11, further comprising:
a pair of cross car slide rails attached to the seat frame of the seat assembly such that the seat assembly is slidable in a vehicle lateral direction.

17. The seat assembly of claim 16, further comprising:
a pair of longitudinal slide rails that attach the seat frame to a vehicle floor such that the seat assembly is slidable in a vehicle longitudinal direction.

18. The seat assembly of claim 16, wherein the tilt pivot axis and the tip up pivot axis are each positioned in between the pair of cross car slide rails.

19. The seat assembly of claim 17, wherein:
the seat assembly is slidable in the vehicle lateral direction along the pair of cross car slide rails by a first actuator, and
the seat assembly is slidable in the vehicle longitudinal direction along the pair of longitudinal slide rails by a second actuator, the first actuator is different from the second actuator.

20. The seat assembly of claim 11, wherein in the tip up position, the tilt motor and the tilt bracket are pivoted towards the seat back in the generally vehicle vertical position.

* * * * *